United States Patent
Singh et al.

(10) Patent No.: US 12,222,962 B1
(45) Date of Patent: **\*Feb. 11, 2025**

(54) SYSTEM AND METHOD FOR EFFICIENTLY DISTRIBUTING TIME-SENSITIVE DATA IN BANDWIDTH-LIMITED ENVIRONMENTS

(71) Applicant: Architecture Technology Corporation, Minneapolis, MN (US)

(72) Inventors: Mandeep Singh, Falls Church, VA (US); William Colligan, Vienna, VA (US)

(73) Assignee: Architecture Technology Coprporation, Minneapolis, MN (US)

( * ) Notice: Subject to any disclaimer, the term of this patent is extended or adjusted under 35 U.S.C. 154(b) by 486 days.

This patent is subject to a terminal disclaimer.

(21) Appl. No.: 17/238,769

(22) Filed: Apr. 23, 2021

Related U.S. Application Data

(63) Continuation of application No. 15/802,570, filed on Nov. 3, 2017, now Pat. No. 10,990,611.

(51) Int. Cl.
| | |
|---|---|
| *G06F 16/27* | (2019.01) |
| *G06F 12/1045* | (2016.01) |
| *G06F 16/2453* | (2019.01) |
| *H04L 47/28* | (2022.01) |
| *H04L 47/32* | (2022.01) |

(52) U.S. Cl.
CPC ........ *G06F 16/278* (2019.01); *G06F 12/1045* (2013.01); *G06F 16/24549* (2019.01); *H04L 47/286* (2013.01); *H04L 47/32* (2013.01)

(58) Field of Classification Search
CPC ....... H04L 47/286; H04L 47/28; H04L 47/32; G06F 16/27; G06F 16/278; G06F 12/08; G06F 12/1045; G06F 16/2453; G06F 16/24549; G06F 15/16
USPC ........................................................ 709/226
See application file for complete search history.

(56) References Cited

U.S. PATENT DOCUMENTS

| | | | |
|---|---|---|---|
| 8,489,720 B1* | 7/2013 | Morford | H04L 12/145 709/225 |
| 9,043,919 B2* | 5/2015 | Wyatt | G06Q 30/0185 707/708 |
| 9,223,612 B1* | 12/2015 | Feldman | G06F 3/0652 |
| 9,229,870 B1* | 1/2016 | Kumar | G06F 12/0868 |
| 9,800,517 B1* | 10/2017 | Anderson | H04L 67/10 |
| 9,819,972 B1* | 11/2017 | Vantalon | H04N 21/643 |
| 9,854,041 B1* | 12/2017 | Singh | G06F 3/0647 |
| 9,912,752 B1* | 3/2018 | Davis | G06F 16/2365 |
| 9,923,757 B1* | 3/2018 | Hester | G06F 21/552 |
| 10,025,718 B1* | 7/2018 | Wasiq | G06F 12/0866 |
| 10,108,658 B1* | 10/2018 | Cole | G06F 16/2365 |

(Continued)

*Primary Examiner* — James N Fiorillo
(74) *Attorney, Agent, or Firm* — Key IP Law Group, PLLC

(57) ABSTRACT

A method for adaptively providing processed data to elements of a distributed network, includes a processor partitioning data from a plurality of data sources, including big data from a plurality of big data sources based on defined needs of the elements; the processor storing the partitioned data in a central data source and a subset of the partitioned data in one or more cache memories in proximity to the elements; receiving a data request from a network element; determining a time-sensitivity of data responsive to the data request; supplying a response to the data request for non-time-sensitive data; and supplying the response to the data request for time-sensitive data.

20 Claims, 10 Drawing Sheets

(56) References Cited

U.S. PATENT DOCUMENTS

| | | | |
|---|---|---|---|
| 10,769,146 B1* | 9/2020 | Jian | G06F 16/24532 |
| 2006/0268913 A1* | 11/2006 | Singh | H04L 49/90 |
| | | | 370/474 |
| 2007/0294393 A1* | 12/2007 | Smith | H04L 47/283 |
| | | | 709/224 |
| 2008/0192820 A1* | 8/2008 | Brooks | H04N 21/2385 |
| | | | 348/E7.071 |
| 2008/0212472 A1* | 9/2008 | Musacchio | H04L 49/254 |
| | | | 370/232 |
| 2010/0135313 A1* | 6/2010 | Davis | H04L 45/60 |
| | | | 370/419 |
| 2011/0047271 A1* | 2/2011 | Guibe | H04L 47/32 |
| | | | 709/226 |
| 2012/0233261 A1* | 9/2012 | Ma | G06F 16/2453 |
| | | | 709/204 |
| 2013/0311612 A1* | 11/2013 | Dickinson | H04L 67/02 |
| | | | 709/219 |
| 2014/0136782 A1* | 5/2014 | Thomas | G06F 16/16 |
| | | | 711/E12.016 |
| 2014/0379990 A1* | 12/2014 | Pan | G06F 12/0871 |
| | | | 711/135 |
| 2015/0067819 A1* | 3/2015 | Shribman | H04L 67/567 |
| | | | 709/218 |
| 2015/0089185 A1* | 3/2015 | Brandyberry | G06F 11/2058 |
| | | | 711/207 |
| 2015/0317223 A1* | 11/2015 | Cho | G06F 11/14 |
| | | | 714/4.11 |
| 2015/0350321 A1* | 12/2015 | Klose | H04L 51/18 |
| | | | 709/217 |
| 2016/0142512 A1* | 5/2016 | Dickinson | H04L 67/1097 |
| | | | 709/219 |
| 2016/0373334 A1* | 12/2016 | Gintis | H04L 43/50 |
| 2017/0116651 A1* | 4/2017 | Greenberger | H04W 4/022 |
| 2018/0219647 A1* | 8/2018 | Paso | H04L 47/28 |
| 2018/0260125 A1* | 9/2018 | Botes | G06F 11/2094 |
| 2018/0329712 A1* | 11/2018 | Palani | G06F 12/127 |
| 2020/0042183 A1* | 2/2020 | Meiri | G06F 3/065 |
| 2020/0274643 A1* | 8/2020 | Kodaypak | H04L 1/0045 |
| 2021/0360066 A1* | 11/2021 | Karumbunathan | G06F 3/065 |
| 2021/0385169 A1* | 12/2021 | Urman | H04L 1/08 |

* cited by examiner

SYSTEM AND METHOD FOR EFFICIENTLY DISTRIBUTING TIME-SENSITIVE DATA IN BANDWIDTH-LIMITED ENVIRONMENTS

RELATED APPLICATIONS

This application is a continuation of U.S. patent application Ser. No. 15/802,570, filed Nov. 3, 2017, entitled Adaptive Data Processing System and Method, now U.S. Pat. No. 10,990,611, issued Apr. 27, 2021. The disclosures of these patent documents are hereby incorporated by reference

BACKGROUND

Some organizations require analysis and use of an ever-increasing supply of data. The data may be collected by a single source or multiple sources. The collected data may be structured, semi-structured, or unstructured. Some of the data may be perishable, meaning the data are of most value when used in real-time or near real-time. Some of the data may update frequently. In some situations, elements of an organization may need access to the data within hours or minutes of its placement into a database, while other elements may require a longer view of the data. Furthermore, some elements of the organization may require access to specific subsets of the data and other elements may require access to other subsets of the data. Finally, some elements of the organization may be able to use high bandwidth links to access the data while other elements may have access only to low bandwidth links. In any of these situations, the volume (or density) of the data, as well as the velocity of the data, may challenge the organization to make effective use of the data. In particular, finding anything of use in a set of "big data" may be difficult because of the size of the dataset and because, oftentimes, the data must be retrieved, processed, and analyzed in a very time-compressed fashion if the data are to be of any use. A classic example may be the large-scale data collection processes used by the National Security Agency (NSA) to capture all cell phone transactions having any connection to the United States. The data collected are so voluminous that data have little if any relevance or use in a real-time scenario.

Some attempts to deal with these and other "big data" issues involve use of large scale, centralized data platforms. For example, the data volume of the NSA cell phone intercept program is so large that a specially-designed data collection farm was built to house the data (i.e., at the Utah Data Center, also known as the Intelligence Community Comprehensive National Cybersecurity Initiative Data Center, which is designed to store data estimated to be on the order of exabytes or larger). Many other government agencies as well as many non-government organizations (NGOs) and private companies (e.g., Google) also may face the obstacle of analyzing a "big data" source, and platforms such as Apache Hadoop and Oracle's Big Data Appliance are designed for big data analytics. However, even though possibly at a smaller scale than the NSA facility, these platforms also suffer from "data overload," making real-time or near real-time data usage difficult or impossible.

SUMMARY

A computer-implemented method for dispersing data objects to organization elements in a network includes a computer: ingesting data from one or more data sources; partitioning the ingested data into one or more data objects; storing the one or more data objects, receiving a data query from an organization element; determining a time-based sensitivity of the data query; sending a response to a non-time-sensitive data query from the central data structure; and sending a response to a time-sensitive data query from one of the cache memories. Storing the one or more data objects includes storing selected ones of the data objects in a central data structure, and diffusing other selected ones of the data objects for storage in one or more cache memories distributed throughout the network. Diffusing other selected ones of the data objects includes identifying one or more cache memories in proximity to the organization element; sending the other selected ones of the data objects to at least one of the identified one or more cache memories; and the at least one of the identified one or more cache memories replicating the other selected ones of the data objects, and sending the replicated data objects to an additional cache memory in proximity to the organization element.

Partitioning the ingested data includes the computer: identifying a schema for the ingested data; identifying a data source of the ingested data; identifying perishability of the ingested data; identifying first data object subsets based on the identified schema; identifying second data object subsets based on historical partitioning patterns for data from the identified data source; identifying third data object subsets based on historical data queries from the organization elements; identifying fourth data object subsets based on the identified perishability of the ingested data; and partitioning the ingested data into a plurality of data object subsets based on the first, second, third, and fourth identified data object subsets, and combinations of the first, second, third, and fourth identified data object subsets.

The method further includes the computer ingesting data from a push data source; and the computer ingesting data from a pull data source; and the data sources include one or more of structured, semi-structured, and unstructured data sources. Identifying one or more cache memories in proximity to an organization element includes the computer receiving a GPS location of the organization element. Diffusing other ones of the data objects includes assigning to an original data object a counter value and to each replica of the original data object an incrementing counter value; comparing the incrementing counter value to a pre-defined threshold; and stopping the diffusing when the incrementing counter value reaches the pre-defined threshold. Diffusing other ones of the data objects also includes assigning a time to live to each of the other ones of the data objects; stopping the diffusing when the time to live expires; and flushing the other ones of the data objects from the cache memories. In an aspect, the time to live is based on an identified perishability of the ingested data. Sending the response includes identifying a bandwidth of a link for sending the response from one or more of the cache memories to the organization element; and sending the response over a highest bandwidth link.

A method for adaptively providing processed data to elements of a distributed network includes a processor partitioning data from a plurality of data sources, including big data from a plurality of big data sources, based on defined needs of the elements; the processor storing the partitioned data in a central data source and a subset of the partitioned data in one or more cache memories in proximity to the elements; receiving a data request from a network element; determining a time-sensitivity of data responsive to the data request; supplying a response to the data request for non-time-sensitive data; and supplying the response to the data request for time-sensitive data.

A non-transitory, computer-readable storage medium having encoded thereon a program of machine instructions for diffusing data objects to organization elements in a network of distributed organization elements, wherein the processor executes the machine instructions to: ingest data from one or more data sources; partition the received data into one or more data objects; store the one or more data objects, comprising the processor executing the machine instructions to: store selected ones of the data objects in a central data structure, and diffuse other selected ones of the data objects for storage in one or more cache memories distributed throughout the network, comprising the processor executing the machine instructions to: identify one or more cache memories in proximity to an organization element; send the other selected ones of the data objects to at least one the identified one or more cache memories; and the at least one of the identified one or more cache memories replicating the other selected ones of the data objects and sending the replicated data objects to an additional cache memory in proximity to the organization element, receive a data query from the organization element; determine a time-based sensitivity of the data query; send a response to a non-time-sensitive data query from the central data structure; and send a response to a time-sensitive data query from one of the cache memories.

A system for diffusing data in a computer-based distributed network, comprising: a central data storage and processing center that ingests and processes incoming data from a plurality of data sources, including a plurality of big data sources, the data storage and processing center comprising one or more data storage devices and one or more central processors; a plurality of organization hosts distributed in the network, each organization host comprising one or more cache memories and one or more non-transitory, computable-readable host data stores and host processors; one or more organization elements, the organization elements including fixed organization elements and mobile organization elements, each organization element comprising a non-transitory, computer-readable element data store and an element processor; and a program of machine instructions distributed among the data storage devices, host data stores, and the element data store, wherein the program of instructions are executed by processors to: ingest data from one or more data sources; partition the received data into one or more data objects; store the one or more data objects, comprising the processor executing the machine instructions to: store selected ones of the data objects in a central data structure, and diffuse other selected ones of the data objects for storage in one or more cache memories distributed throughout the network, comprising the processor executing the machine instructions to: identify one or more cache memories in proximity to an organization element; send the other selected ones of the data objects to at least one the identified one or more cache memories; and the at least one of the identified one or more cache memories replicating the other selected ones of the data objects and sending the replicated data objects to an additional cache memory in proximity to the organization element, receive a data query from the organization element; determine a time-based sensitivity of the data query; send a response to a non-time-sensitive data query from the central data structure; and send a response to a time-sensitive data query from one of the cache memories.

DESCRIPTION OF THE DRAWINGS

The detailed description refers to the following figures in which like numerals refer to like objects, and in which.

DETAILED DESCRIPTION

Figure 1A:
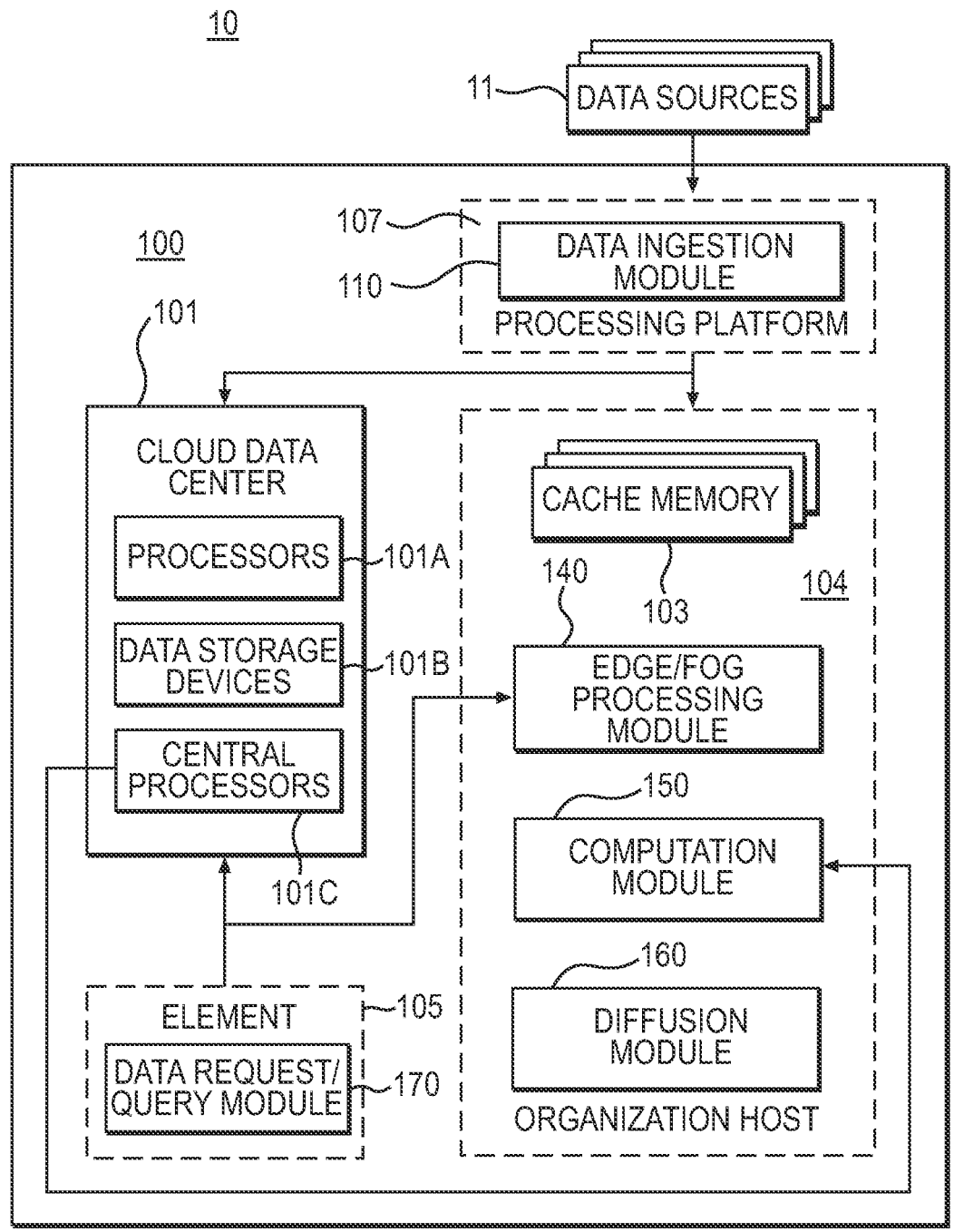
FIGS. 1A-1C illustrates an example adaptive data processing (ADP) system, and structures, modules, and components thereof.

Big data may be thought of as a large volume of data, or a volume of very dense data. However, the volume or density of the data may not present the only, or even the primary challenge in using these data. How the large or dense data are collected, processed and assembled may be more significant. In particular, a large dataset may be large because data are continually added to it. Furthermore, the added data may be perishable, meaning its utility to some elements of an organization may diminish, or become valueless if not used in real-time or near real-time (i.e., within minutes or even seconds of its collection and assemblage). In addition, the data collection and assemblage may accelerate over time. For example, data collection a year ago may occur with a velocity $V1$. Current data collection may occur at velocity $V2 \gg V1$. Furthermore, data density, $D$, may similarly increase over time; thus, $D2$ may be much greater than $D1$ ($D2 \gg D1$). Data density $D$ may increase as data resolution increases and/or more data sources or data generators come into existence. A classic example of this accelerating data collection phenomena occurs in the realm of weather forecasting, where an increasing number of weather data sensors produce an increasing density and velocity of weather data. The product of data density $D$ and data velocity $V$ ($D \times V$) is referred to herein as data volumetric flowrate $W$.

Consider an organization whose operations are affected by local and national weather patterns. The accelerating collection of weather data may stress the organization's information technology (IT) infrastructure and its bandwidth for weather data dissemination. The accelerating data growth may be due in part to new sensors and satellites coming online. In addition, many organizations have migrated to the United Kingdom Met Office (UKMO) weather model (i.e., the Unified Model). The Unified Model provides data in a much denser resolution than previous models. This data density, coupled with the fact that weather data is highly perishable, expiring in the matter of hours or minutes for critical information, may outstrip the capabilities of the organization's current IT infrastructure and its ability to provide weather forecasts to elements of the organization. Attempts have been made to resolve the data growth problem by employing ever-larger (and faster) hardware platforms; however, these traditional solutions may not be able to keep pace with the acceleration of data collection. Apart from the ever-increasing resolution and size of the data, the perishability of the weather data has proven to be very challenging. When current data are critical to the success of the organization, these traditional solutions likely will fall short.

To overcome limitations of current big data platforms and solutions, disclosed herein is an adaptive data processing (ADP) system, and a corresponding ADP method. The ADP system ingests, processes, stores, and disseminates data efficiently, reduces the negative effects of data acceleration, and reduces delays in responding to data requests from an organization's elements or users (here, elements refers to machines and users refers to humans). To reduce negative effects of such data acceleration, the ADP system executes to analyze growth patterns for data used by the organization and determines an optimum storage plan for such data. In an aspect, the ADP system reduces these negative effects through use of an adaptable and agile hierarchical data storage system. The ADP system further processes these data based on the historical time sensitivity of the data as well as in response to data requests from specific organization elements. The ADP system may filter data requests and responses for small areas of interest and may disseminate data according to the identity, characteristics, and location of the requesting organization element as well as the element's bandwidth capabilities. In responding to a data request from an organization element, the ADP system may employ edge and/or fog computing techniques to reduce latency. Finally, the ADP system may employ a data diffusion structure to disseminate the requested data among multiple organization elements of the organization.

FIG. 1A illustrates an example adaptive data processing (ADP) system in a big data environment. In FIG. 1A, big data environment 10 includes one or more big data sources 11. The big data sources 11 may provide structured, semi-structured, and unstructured data. ADP system 100 operates to ingest data from the big data sources 11. The ADP system 100 may receive some portion of the data through a push operation such as a subscription service. The ADP system 100 may receive other data portions through an active data collection process such as by use of a Web crawler or other active data collection mechanisms (i.e., pull mechanisms). Although the illustrated environment is a big data environment, the ADP system 100 may be applied to any data environment.

The example ADP system 100 includes data structures in which the received data are housed, including cloud data center 101 and cache memories 103. The cloud data center 101 includes processors 101A and data storage devices 101B. The cloud data center 101 may include central processor 101C that executes instructions to manage cloud data storage and processing. The cloud data center 101 may be implemented as one or more data warehouses or facilities.

The cache memory 103 may be implemented as static random access memory or flash memory, or other memory forms that provide rapid data access.

Figure 1B:
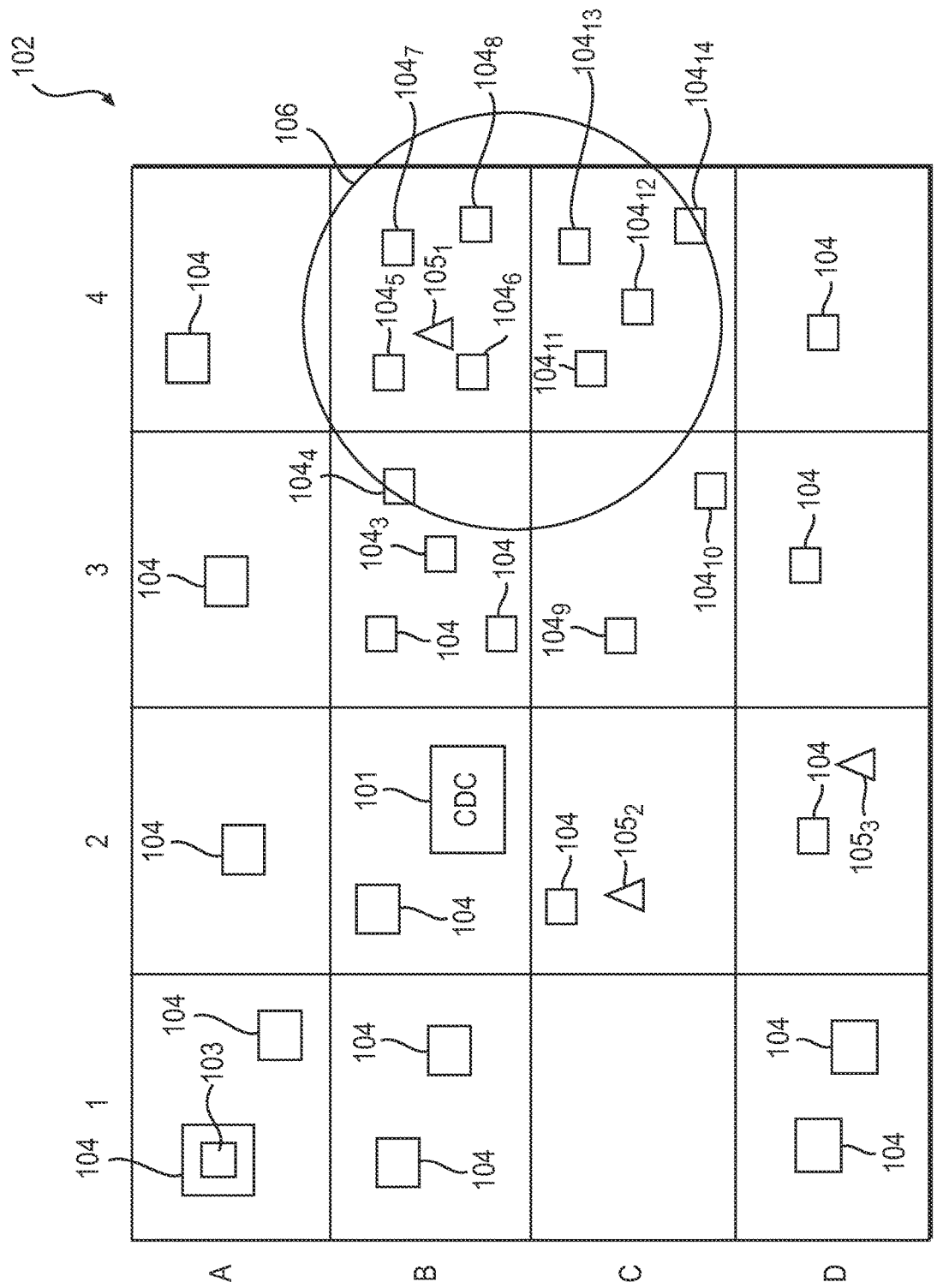

FIG. 1B illustrates an example arrangement of the cloud storage center 101 and the cache memories 103. For ease of description, FIG. 1B illustrates a geographical grid with individual grid segments identified by a letter-number combination such as A1 for the upper left grid segment. The grid segments may be defined by latitude and longitude, such as one degree of latitude and one degree of longitude for each grid segment, for example. Cloud data center 101 can be seen to exist physically in grid segment B2. One or more of the grid segments may include an organization host 104 (e.g., a computing platform) that in turn includes one or more local cache memories 103. The organization host 104 (and hence its local cache memory or memories 103) may be fixed or mobile. The organization host 104 also includes one or more processors and a data store (not shown). Also shown in FIG. 1B are organization elements 105, which may be mobile or fixed, and which may, but need not include a cache memory 103. The organization element 105 includes a data store, memory, and one or more processors (not shown). In an aspect, an organization element 105 also may be an organization host 104, in which case the organization element 105 also may include one or more cache memories 103. Together, the organization hosts 104, organization elements 105, and cloud data center 101 form an organization network 102. Within the organization network 102, subsets of the organization hosts 104 may form a subnet such as subnet 106.

The organization element 105 may issue a data request/query, and the data request/query may be answered from the cloud data center 101 or from a cache memory 103 resident on the organization element 105 itself or an organization host 104, as described herein. In an aspect, an organization host 104 also may issue a data request/query, with that data request/query answered from the cloud data center 101 or a cache memory 103, including a cache memory 103 resident on the organization host 104 itself. The example arrangement of FIG. 1B is used herein to explain an example data diffusion process effectuated through execution of modules and components of the ADP system 100.

Returning to FIG. 1A, the ADP system 100 further includes data ingestion module 110 that executes to ingest and process the big data from the big data sources 11 and distribute the ingested and processed big data to one or more of the cloud data center 101 and the cache memories 103. In an embodiment, the data ingestion module 110 may be instantiated on computing platform 107. The computing platform 107 is shown as separate from the cloud data center 101, but, in an embodiment, may be included in the cloud data center 101. The data ingestion module 110 is shown in more detail in FIG. 1C. The ADP system 100 still further includes edge/fog computing modules 140, computation module 150, diffusion module 160, and data request/query module 170, some or all of which may be instantiated on organization host 104.

Figure 1C:
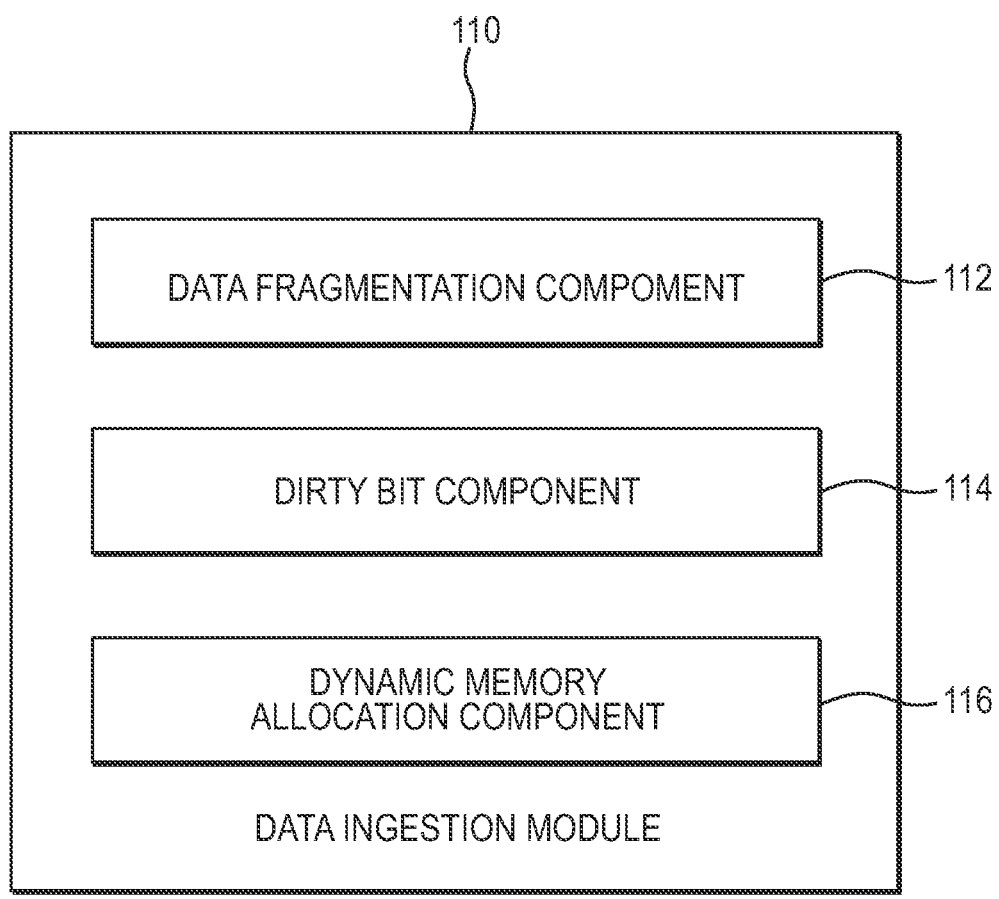

In FIG. 1C, an example data ingestion module 110 includes fragmentation component 112, dirty bit component 114, and dynamic memory allocation component 116. The fragmentation component 112 may execute a pre-defined data partition scheme wherein the ingested data are fragmented into two or more data objects. The partition scheme may be defined by the organization based on past data usage requirements as well as future data usage expectations. The data may be fragmented horizontally, vertically, by specific data source, by time of receipt, and by any combination of these partitions. As an example, ingested data may be fragmented according to its geographical relevance. The geographical fragmentation may be based on latitude and longitude sectors (e.g., sectors of one degree of latitude and one degree of longitude), by political boundaries (e.g., cities and states; countries), time zones, or any other geographical partition scheme or combination of geographical partition schemes. Such geographical partitions may be either horizontal or vertical depending on the nature and organization of the ingested data. As another example, ingested data may be fragmented according to the nature or subject matter of the data (e.g. oceanographic data, atmospheric data, topographical data). As yet another example, ingested data may be fragmented according to its source (e.g., a Federal government agency, state agencies, NGOs, private corporations; subscription data from a trusted source, data acquired by a Web crawler, and specific data queries). The data may be fragmented further by combining different partition schemes.

In addition to the above-described fragmentation processes executed by the ADP system 100, the ADP system 100 also may execute iterative fragmentation processes that result in even more granular data objects. The more granular data objects may be dispersed to cache memories 103 and the cloud data center 101. Using the example of weather data, the fragmentation component 112 may provide weather forecast data on a one-degree latitude/longitude basis and also on a one-minute latitude/longitude segments. The weather forecast data further may be fragmented by week, day, and hour. Referring to FIG. 1B, this more granular data may be dispersed to organization hosts 104 (and their cache memories 103) in geographical locations in proximity to the granular latitude/longitude segments. Furthermore, the weather forecast data may be stored for combined granular time segments and granular latitude/longitude segments. Finally, the more granular data also may be stored with the cloud data center 101. Example uses of this more granular data by other components of the ADP system 100 is described in more detail herein.

Some data to be ingested by the ADP system 100 may be formatted according to a specific database schema. For example, the incoming data may be provided in one or more tables following a SQL database schema. In this situation, the data fragmentation component 112 may fragment the data by table, by a row or rows of one or more tables, and by a column or columns of one or more tables. In addition, the data fragmentation component 112 may fragment the data by a specific entry, or multiple entries (but less than all entries) in a table, a row, or a column. Other incoming data may follow other well-known database schemas and may be fragmented in consideration of those schemas. However, some incoming data may be semi-structured or unstructured, making accurate fragmentation a challenge. For example, some incoming data may be semi-structured or unstructured text, examples of which include blog posts and emails. For these data types, data fragmentation may be based on metadata (e.g., date and time an email was sent), header data (e.g., email address) and key words (e.g., text found in an email subject line, sending or receiving party name, etc.).

In an aspect, the data fragmentation component 112 may be adaptive and agile in the sense that the specific data fragmentation process may evolve or change as specific data requests/queries are issued from the organization elements 105. That is, one or more organization elements 105 may make repetitive or similar data requests/queries. The data fragmentation component 112 may receive a history of data requests/queries from the organization elements 105 (and the organization hosts 104), and the data fragmentation component 112 (in an aspect, incorporating a machine learning device), may adapt to provide specific data products (data objects) in anticipation of further same or similar data requests/queries from the same or similar organization elements 105.

Returning to FIG. 1B, the organization elements 105, as noted, may be fixed or mobile. Fixed organization elements 105 may have an exact geographic location statement (e.g., latitude and longitude down to hundredths of a second). Mobile organization elements 105 may provide their current geographical position (passively or actively) using, for example, a GPS system. In an aspect, the data fragmentation component 112 may fragment ingested data based on the known geographic location of a fixed or mobile organization element 105.

The data fragmentation component 112 may execute to assign each data object an identification that defines the source of the data (e.g., a larger data chunk from which the data object originated and/or the specific data source 11 providing the data from which the data object is formed). The data fragmentation component 112 also may provide, with each data object, a list of all data objects partitioned from the larger data chunk and from the data source 11.

Although the data fragmentation component 112 may execute to fragment some or all incoming data (some ingested data may be so granular that fragmentation is not necessary), the ADP system 100 may maintain a copy of the larger data chunks. For example, the ADP system 100 may store all ingested data in its original large chunk form in the cloud data center 101.

The dirty bit component 114 executes to prevent or limit the effects of stale data and to increase data processing efficiency. The dirty bit component 114 also executes to improve memory management in situations where incoming data are not different, or only minimally are different, from existing data and in other situations. In a high volume, high data velocity environment, data accumulates quickly and may change just as quickly. However, some data changes slowly or experiences only minor change.

A dirty bit (or modified bit) provided through execution of the dirty bit component 114 is a bit associated with a computer memory block (i.e., a data storage location) and indicates whether or not the corresponding memory block has been modified. For example, a CPU (processor) may read data stored in persistent storage and temporarily store the data in a cache. The data stored in the cache may be changed through operations executed by the processor. The dirty bit is set when the processor modifies the cached data. The dirty bit indicates that its associated memory block (i.e., data) has been modified and has not been written (saved) to persistent storage. When a memory block is to be replaced, its corresponding dirty bit is checked to see if the memory block needs to be written back to storage before being replaced or if the memory block simply can be removed. Dirty bits further may be used by a CPU cache and in page replacement algorithms of an operating system. Dirty bits also may be used in Incremental computing by marking data that need to be processed or have yet to be processed. This technique may be used to avoid unnecessary processing of data that have not changed.

To account for the volumetric flow rate W of ingested data, the dirty bit component 114 may execute to attach a dirty bit to each data object before the data object is stored in the cloud data center 101 or a cache memory 103. A dirty bit appended to a data object indicates the data object is modified but not saved. This process accounts for data perishability by issuing a notification to components of the ADP system 100 that new data have been ingested. The notification allows components of ADP system 100 to verify the that just-ingested data are significantly different from recently stored data. If a significant difference exists, data storage may be updated; otherwise the changed data may be neglected and may not need to be stored, thereby ensuring an efficient use of data storage.

After the ingested data are fragmented into data objects, the dynamic memory allocation component 116 sends the data objects to specific locations in cloud data center 101 or cache memories 103 for storage, possible further processing, and possible further dispersion. Such dynamic memory allocation may be particularly helpful when the ADP system 100 ingests highly perishable data whose useful life may be on the order of hours or minutes. Since such data changes rapidly, data updates may be frequent and updated data should be dispersed to organization elements 105 in a timely, efficient manner. Accordingly, the dynamic memory allocation component 116 allocates the ingested data to memory dynamically to ensure that memory resources are efficiently used and that required data are updated and stored according to demand. This dynamic memory allocation also frees up memory by deleting (overwriting) data that no longer are needed by the ADP system 100, which in turn limits data corruption and other run-time errors, system-wide failures, and failure to write data back to the cloud data center 101.

The data may be stored at different locations and levels using a memory hierarchy, an example of which is shown in FIG. 1A, namely the cloud data center 101 and multiple cache memories 103, where the cloud data center 101 is higher in the hierarchy than are the cache memories 103. Note that while FIG. 1A shows a two-level memory hierarchy, the ADP system 100 may employ one memory level or more than two memory levels. In an aspect, all critical data that may be requested by the organization elements 105 in the near as well as distant future, after being fragmented, are stored in the cloud data center 101. Cloud computing may be used at this level to process any data request/query from, and to provide responses (data objects) to, the organization elements 105. Big data techniques may be used at the cloud data center 101 to process various data requests/queries and filter appropriate responses before sending data objects to the requesting organization elements 105.

A second level of memory hierarchy includes distributed cache memories 103, where perishable and/or time-sensitive data may be stored for a relatively short period for real-time processing. The ADP system 100 uses forward-caching techniques to reduce delays in request and response times.

As shown in FIG. 1A, each organization element 105 may include a data request/query module 170 that executes (generally as directed by a user, but in some situations, automatically and autonomously) to send a data request/query to other components of the ADP system 100. Which component that is to receive the data request/query may be determined by execution of the data request/query module 170. As an example, if the data request/query is time sensitive (a need for current data at a specific geographic location, for example) or/and is sent over a low bandwidth link, the data request/query module 170 may send the data request/query to a cache memory 103 by way of an edge/fog processing module 140, where an intelligent device processes the data request/query without any delays; if the data are not time sensitive, the data request/query module 170 may send the data request to the cloud data center 101. In an embodiment, one or more organization hosts 104 may include the edge/fog processing module 140 as well as the cache memories 103, computation module 150, and diffusion module 160. In another embodiment, some aspects of the modules 150 and 160 may be included in the central processor 101C. As another example, the organization element 105 may not have access to the cloud data center 101, in which case the data request/query module 170 may send the data request/query to a cache memory 103 by way of edge/fog processing module 140. These techniques use intelligent devices between the requesting organization element 105 and the cache memories 103 to process requests close to the requesting organization element 105 to reduce response time to milliseconds compared with the minutes to hours that may be required for processing similar requests at the cloud data center 101.

The data requests/queries may be sent for a specific area of interest or for multiple areas of interest at the same time. The requesting organization element 105 may be located at a command center with a full-scale work station and capability of requesting data over high bandwidth links; alternately, the requesting organization element 105 may be part of a mobile platform, and may request data over a low bandwidth link. The data being requested by different organization elements 105 also may vary depending on the time-sensitivity of the data requirement. Furthermore, depending on the type of data request/query, bandwidth in use, and the type and location of requesting organization element 105, the data request/query is sent to the appropriate memory location (the cloud data center 101 or a cache memory 103) for processing.

Some data requests/queries may specify a pattern, one or more key words, a specific data source, a date range, a geographical location, and/or a data type, for example. Processing components at the cloud data center 101 and at organization hosts 104 in proximity to the requesting organization element 105 may analyze a data request/query and based on the analysis, may retrieve responsive data objects from their respective cloud data locations or cache memories 103. Alternately, or in addition, the processing components may extract, summarize, or reformat data in the stored data objects and present the extracted, summarized, or reformatted data objects to the requesting organization element 105, thereby creating one or more new data objects. The new data object(s) may be stored at the originating organization host 104 and may be replicated and diffused to additional organization hosts 104 until the newly-created data object achieves a stable distribution in the network 102.

In an embodiment, the network 102 (see FIG. 1B) is constituted as a hybrid peer-to-peer network with equal peer nodes (e.g., the organization hosts 104), where at least some of the nodes (e.g., the organization hosts 104) simultaneously function as both clients and servers to the other nodes (e.g., the organization elements 105 and certain of the organization hosts 104) on the network 102. This hybrid peer-to-peer network structure differs from a client-server structure, where communication is usually to and from a central server in which a file transfer protocol (e.g., File Transfer Protocol (FTP)) uses the client-server structure in which the client and server programs are distinct: the clients initiate the transfer, and the servers satisfy these requests. The hybrid peer-to-peer network 102 may include a virtual overlay network on top of the physical network topology of the network 102, where nodes in the overlay form a subset of the nodes in the physical topology. Data still are exchanged directly over the underlying TCP/IP network, but at the application layer, nodes communicate with each other directly, via logical links in the overlay network (each of which corresponds to a path through the underlying physical network). The overlay network also may be used for indexing and peer discovery, and make the peer-to-peer overlay independent from the physical network topology. The hybrid nature of the network 102 may include an unstructured form of the physical aspect of the network 102, making easier addition of nodes to the network 102 and making the network 102 more robust in the face of high rates of churn; i.e., large numbers of nodes frequently joining or leaving the network 102. The network 102 further includes protocols to enhance discovery of adjacent nodes (i.e., the ability of an organization element 105 to identify nearby organization hosts 104) in order to improve the ability to send data requests and receive prompt responses.

The ADP system 100, through the computation module 150, employs computation techniques that ensure efficient use of memory, as well as processing power and other resources, to process data and appropriately respond to data requests.

In an embodiment, the ADP system 100 may use diffusion module 160 to optimize data object distribution to requesting organization elements 105. In an aspect, this distribution may involve a preceding distribution process to provide data objects to one or more cache memories 103 using a diffusion process. Returning to FIG. 1B, the process executed by diffusion module 160 may allow the ADP system 100 to quickly respond to data requests/queries from fixed or mobile organization elements 105—in FIG. 1B, organization element 1051 is a mobile organization element, but may be expected to operate in the vicinity of grid segments B3-C4. The organization element 1051 may have a history of requesting a specific data object type—for example, topographical data related to its current of immediately-future geographical location. Furthermore, similar organization elements 105 in proximity to organization element 1051 may make similar data requests, or may need the same data object(s). In addition, the requested data may be time sensitive. Still further, the data links available to the organization element 1051 and the other organization elements 105 may be unreliable or may have a low bandwidth. To address these issues, the data diffusion module 160 may execute to distribute the requested data object to each organization element 105 individually, multicast the requested data object, or diffuse the data object among the organizational hosts 104. In an aspect, the general or specific location of the requesting organization element 1051 may be known, in which case the module 160 may execute to direct dispersion of the requested data object(s) based on the known location of the organization element 1051.

The diffusion module 160 cooperates with other components and modules of the ADP system 100 to control some aspects of data object distribution to a requesting organization element 105. The diffusion module 160 may affect data object distribution to fixed and mobile organization elements 105. Through execution of the diffusion module 160, organization hosts 104 may receive, store, copy and publish data objects. Organization elements 105 may issue a data request/query, and the data request/query may be answered by data objects that satisfy the data request/query and that are published or dispersed throughout the network of organization hosts 104. Thus, the diffusion module 160 executes to disperse copies of published data objects among organization hosts 104. The data object dispersal includes storage of the original data object and copies thereof copies near (or at) organization elements 105 that may query for them; the dispersal thereby provides redundancy so that data objects are not lost. To achieve this redundancy while minimizing resource consumption (e.g., bandwidth and memory capacity) and data object latency, the data object dispersion executes to achieve a pre-determined data object density range among the various organization hosts 104. Thus, the data object dispersion relies on the organization hosts 104 to quickly replicate and further disperse the data objects until the data object density stabilizes within a pre-determined data object density range. In an aspect, the data objects may be dispersed to a specific subnet of organization hosts 104. In the example of FIG. 1B, subnet 106 may encompass organization hosts 1044-8 and 10411-13. The data objects may be replicated at each of the organization hosts of subnet 106. Then, if one organization host 104 of subnet 106 is not available, the data request/query from organization element 1051 may be satisfied by other organization hosts 104 of subnet 106. However, if every organization host 104 in subnet 106 were to become unavailable, the requested data object might become "extinct." To prevent this situation, the diffusion module 160 may execute to ensure a pre-defined, stable number of data object replicas are available. In an aspect, when one organization host 104 becomes unavailable, another organization host 104 will replicate its copy of the data object and distribute the replicated data object to additional organization hosts 104 until the pre-defined number of data objects is re-established.

Data objects diffused to the cache memories 103 may include a time to live (TTL) feature, which may be based on the transitory nature of the data objects and/or the capacity of the caches memories 103 and the volumetric flow rate W of the data objects being dispersed. Once the TTL point is reached, processors at the organization hosts 104 may flush (delete) the expired data objects from their cache memories 103. However, in an aspect, a data object may be retained until the later of a request for the data object by an organization element 105 or a pre-set time. In another aspect, data objects that have received a specific number of data requests (e.g., two) that result in data transmission may be flushed from the cache memories 103.

In an embodiment, an example data object diffusion process begins after data are received at a data ingestion module 110 and then partitioned or fragmented to generate two or more data objects. Each data object may be stored at the cloud data center 101. Additionally, one or more data objects may be designated for dispersion to the cache memories 103. If a data object may be identified as relevant to a particular subnet of organization hosts 104 and organization elements 105, the data object may be sent to a specific organization host 104 of the subnet. Thereafter, each organization host 104 may replicate the data object and send the data object to its nearest neighboring organization host 104. If the receiving organization host 104 does not have stored the data object, the receiving organization host 104 stores the data object, replicates the data object, and sends the replicated data object to a neighboring organization host 104. This process continues until a pre-determined number of copies of the data object exist in the network 102. To ensure the desired number of data objects copies exist in the network 102, each storing organization host 104 may add an incrementing counter value to the copy being sent. Thus, for example, if the predetermined number of data objects is five, the fourth copy being sent will have the counter number 5 attached, and no further copies will be made or sent. To ensure the data objects are not maintained for longer than a predetermined time, the data object may have an associated time to live counter; upon expiration of the time to live, each organization host 104 flushes the data object from its associated cache memory 103.

In another embodiment of a dispersion process, the data objects may be multicast to all or a subset of the organization hosts 104. For example, the data object may be multicast to the subnet 106. Following the multicast process, the receiving organization hosts 104 may implement processes to maintain a predetermined number of data objects copies for a specific time to live.

Figure 2:
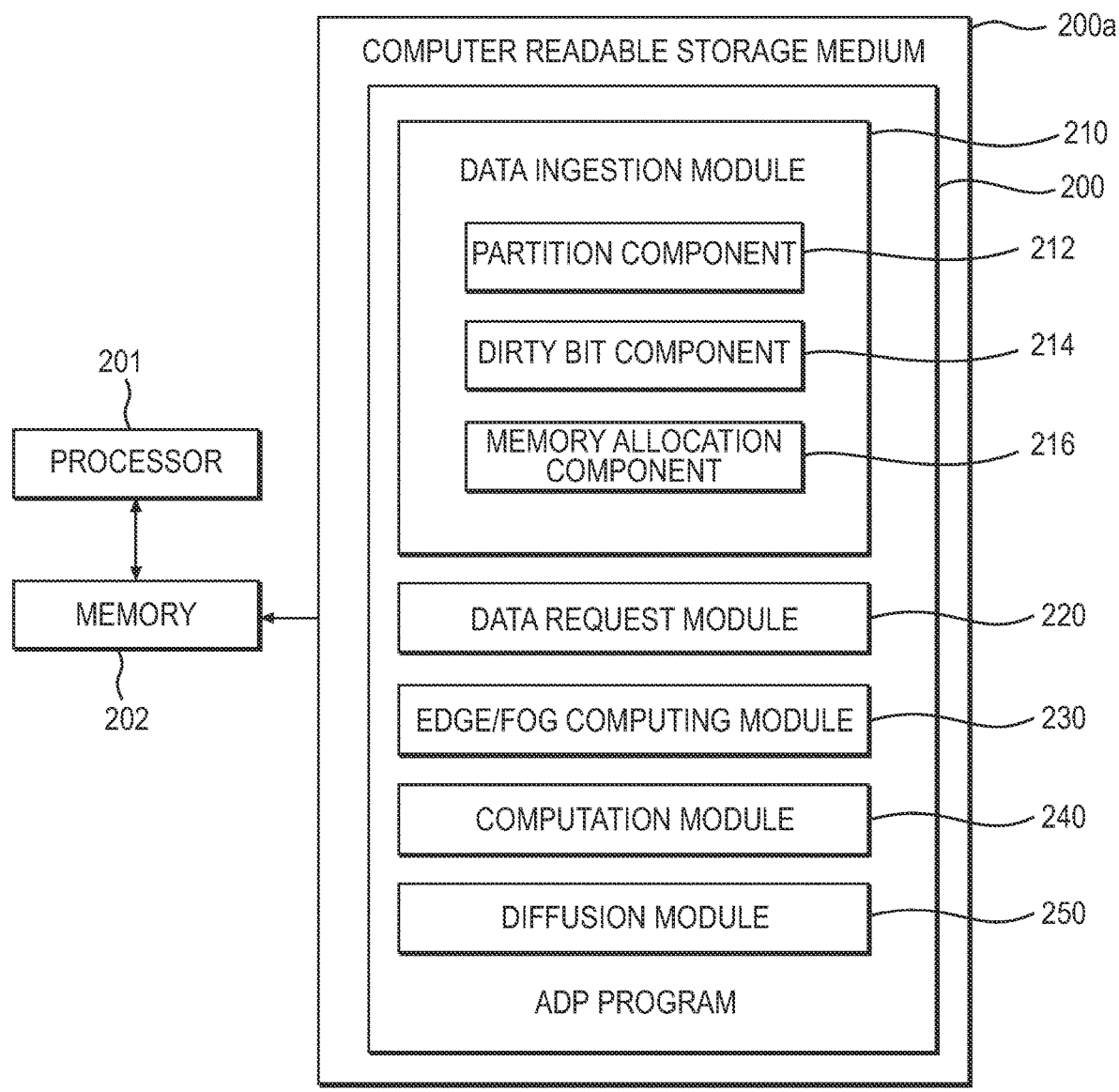
FIG. 2 illustrates another example ADP system.

FIG. 2 illustrates another example adaptive data processing (ADP) system, namely ADP program 200, which includes machine instructions stored on non-transitory, computer readable storage medium 200a. The machine instructions of ADP program 200 may be implemented as one or more modules, including data ingestion module 210, data query module 220, edge computing module 230, computation module 240, and diffusion module 250. The data instruction module 210 includes data partition component 212, dirty bit component 214, and memory allocation module 216.

The non-transitory, computer-readable storage medium 200a may be accessed by processor 201, loaded into memory 202, and then executed to provide adaptive processing of big data sources 11 (not shown in FIG. 2) to produce data objects and then diffuse the data objects among cloud storage and/or cache memories (not shown in FIG. 2).

When executed, the ADP program 200 provides functions similar or identical to those provided by ADP system 100 of FIG. 1A.

FIGS. 3A-5 are flowcharts illustrating example operations of the ADP system 100 of FIG. 1A. In general, the operations include dispersing data objects to organization elements 105 in network 102 beginning with a computer ingesting data from one or more data sources, partitioning the ingested data into two or more data objects; storing the data objects, receiving a data query from the organization element 105; determining a time-based sensitivity of the data query; sending a response to a non-time-sensitive data query from the cloud data center; and sending a response to a time-sensitive data query from a cache memory 103. Storing the data objects includes storing selected data objects in the cloud data center and diffusing other selected data objects for storage in one or more cache memories 103 distributed throughout the network 102. Diffusing the data objects includes identifying one or more cache memories 103 and corresponding organization hosts 104 in proximity to an organization element 105; sending the other selected data objects to at least one the identified cache memories 103; and the identified cache memories, replicating the other selected data objects, and sending the replicated data objects to an additional cache memory 103 in proximity to the organization element 105.

Partitioning the ingested data includes the computer identifying a schema for the ingested data; identifying a data source of the ingested data; identifying perishability of the ingested data; identifying first data object subsets based on the identified schema; identifying second data object subsets based on historical partitioning patterns for data from the identified data source; identifying third data object subsets based on historical data queries from the organization elements 105; identifying fourth data object subsets based on the identified perishability of the ingested data; and partitioning the ingested data into a plurality of data object subsets based on the first, second, third, and fourth identified data object subsets, and combinations of the first, second, third, and fourth identified data object subsets. The method further includes the computer ingesting data from a push data source and from a pull data source; and the data sources include one or more of structured, semi-structured, and unstructured data sources. Identifying one or more cache memories 103 in proximity to an organization element 105 includes the computer receiving a GPS location of the organization element 105. Diffusing the data objects includes assigning to an original data object a counter value and to each replica of the original data object an incrementing counter value; comparing the incrementing counter value to a pre-defined threshold; and stopping the diffusing when the incrementing counter value reaches the pre-defined threshold. Diffusing the data objects also includes assigning a time to live to each of the data objects; stopping the diffusing when the time to live expires; and flushing the data objects from the cache memories 103. In an aspect, the time to live is based on an identified perishability of the ingested data. Sending the response includes identifying a bandwidth of a link for sending the response from the cache memories 103 to the organization element 105; and sending the response over a highest bandwidth link.

Figure 3A:
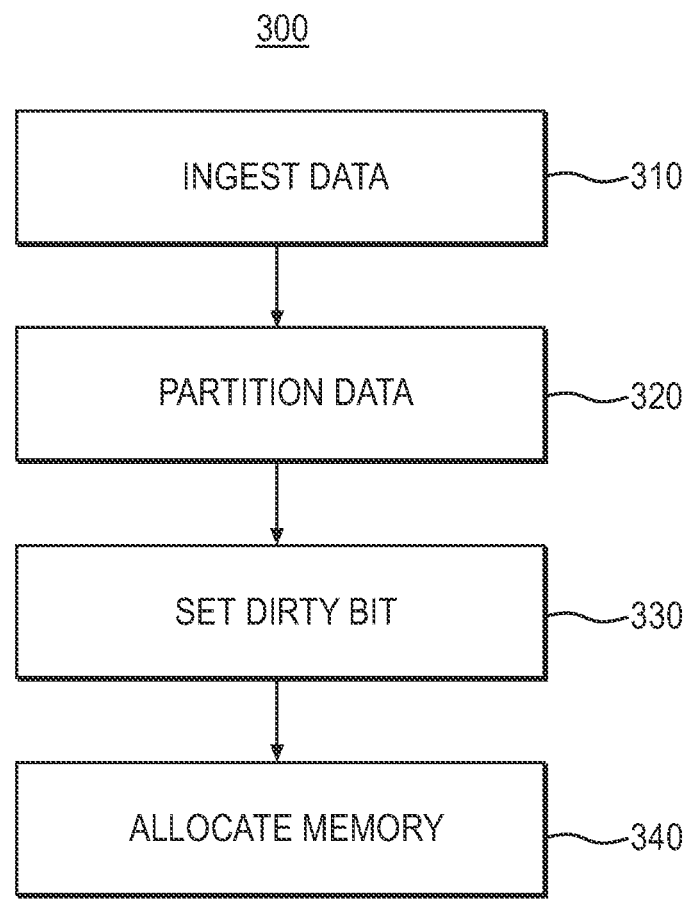
FIG. 3A-3C illustrate example operations of the ADP system of FIGS. 1A-1C.

FIG. 3A is a flowchart illustrating an example operation executed by the ADP system 100. In FIG. 3A, operation 300 begins in block 310, when the data ingestion module 110 receives data (including, in an aspect, big data) from data sources 11 (in an aspect, including big data sources). In block 320, the fragmentation component 112 partitions the ingested data into two or more data objects. In block 330, the dirty bit component 114 may assign a bit to each data object, the bit used to indicate when the data object changes. In block 340, the dynamic memory allocation component 116 allocates each of the data objects to the cloud data center 101 and optionally to one or more cache memories 103.

Figure 3B:
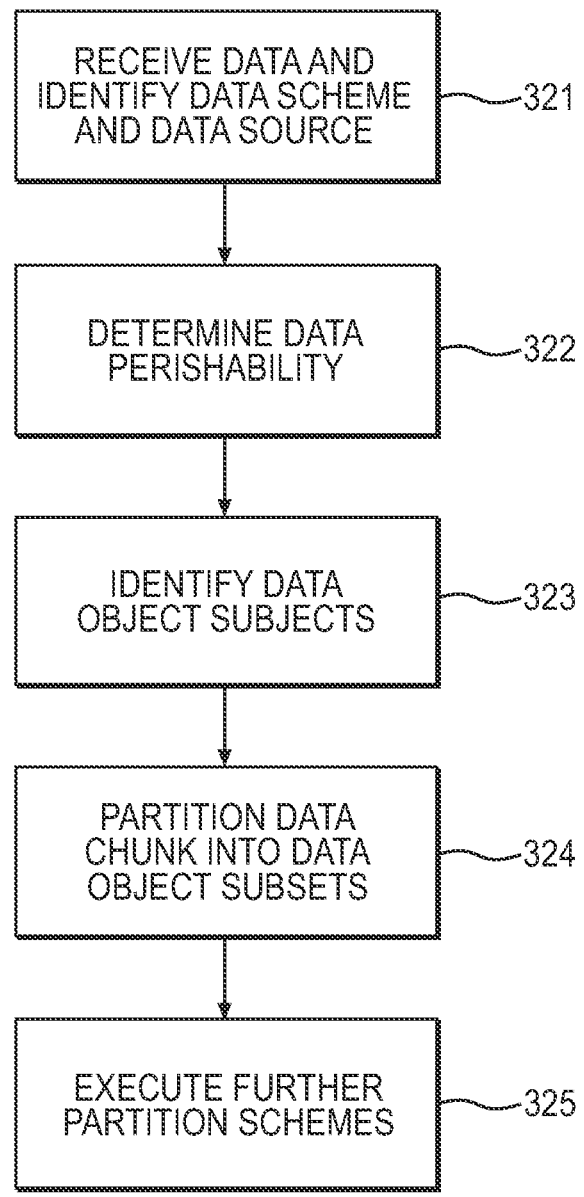

FIG. 3B illustrates an example data fragmentation operation. In FIG. 3B, data fragmentation operation 320 begins in block 321 when the fragmentation component 112 receives an ingested data chunk and identifies, when appropriate, a schema for the ingested data chunk and identifying a data source of the ingested data chunk. In block 322, the component 112 determines perishability of the ingested data chunk. In block 323, the component 112 identifies one or more data object subsets into which the data chunk may be fragmented. For example, the component 112 may identify a first data object subset based on the identified schema, a second data object subset based on historical partitioning patterns for data from the identified data source; identifying a third data object subset based on historical data queries from the organization elements 105, and identifying a fourth data object subset based on the identified perishability of the ingested data. In block 324, the component 112 partitions the ingested data chunk into a plurality of data object subsets based on the first, second, third, and fourth identified data object subsets, and combinations of the first, second, third, and fourth identified data object subsets. In block 325, the component 112 may further partition the data in one or more of the data object subsets based, for example, on units of time (e.g., weeks, days, hours, minutes; size of data in the data object (e.g., a number of megabytes of the data in the data object); geographical relevance of the data; and other criteria. Following block 325, operation 320 ends.

Figure 3C:
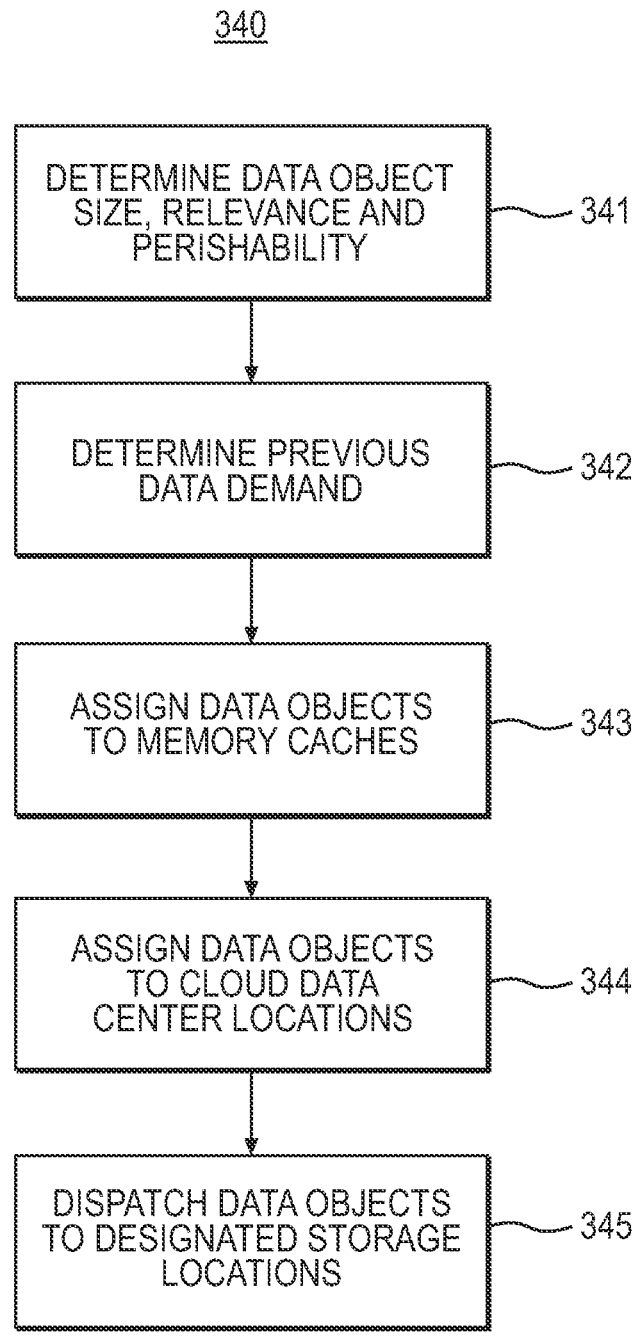

FIG. 3C illustrates an example dynamic memory allocation operation. In FIG. 3C, dynamic memory allocation operation 340 begins in block 341 and the dynamic memory allocation component 116 analyzes the data objects to determine their size, relevance, and perishability. In block 342, the component 116 determines, for each data object, a previous demand for similar data, and a source of the demand. In block 343, the component 116 assigns the data blocks to one or more cache memories 103 based on the analyses of blocks 341 and 342. In block 344, the component 116 determines storage locations in the cloud data center 101 for each of the data objects. In block 345, the component 116 dispatches the data objects to their designated storage locations. The operation 340 then ends.

Figure 4:
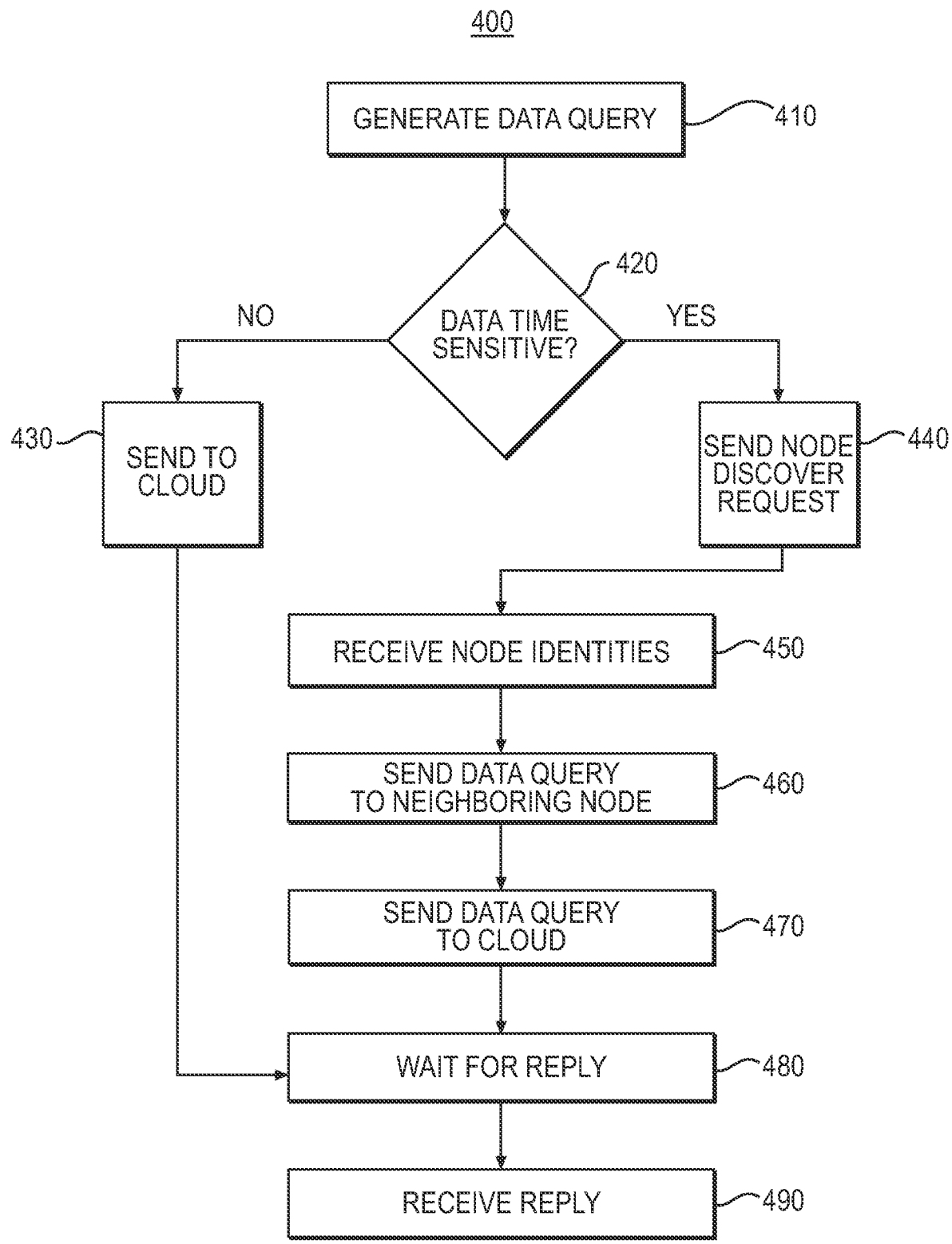
FIG. 4 illustrates another example operation of the ADP system of FIGS. 1A-1C.

FIG. 4 illustrates a data query and corresponding data response process. In FIG. 4, data query and response operation 400 begins in block 410 when a data request/query module 170 of an organization element 105 generates a specific data query for data in the network 102. In block 420, the module 170 determines if the data requested are time-sensitive. If the data requested are not time sensitive, the operation 400 moves to block 430. If the data requested are time sensitive, the operation 400 moves to block 440. In block 430, the module 170 sends the data query to the cloud data center 101. In block 440, if not already done, the module 170 sends a node discovery request to identify organization hosts 104 in proximity to the organization element 105. In block 450, the module 170 receives identifications of one or more neighboring organization hosts 104 and a bandwidth of data links between the organization element 105 and the one or more neighboring hosts 104. In block 460, the organization element 105 sends the data query to a neighboring organization host 104 having the highest link bandwidth. Optionally, in block 460, the organization element 105 sends the data query to all identified neighboring organization hosts 104. Finally, where possible, the organization element 105, in block 470, also sends the data query to the cloud data center 101. Following either blocks 430 or 470, the organization element 105 waits, in block 480, for a reply from an organization host 104. In block 490, the organization element 105 receives a response to the data query, and the operation 400 ends.

Figure 5:
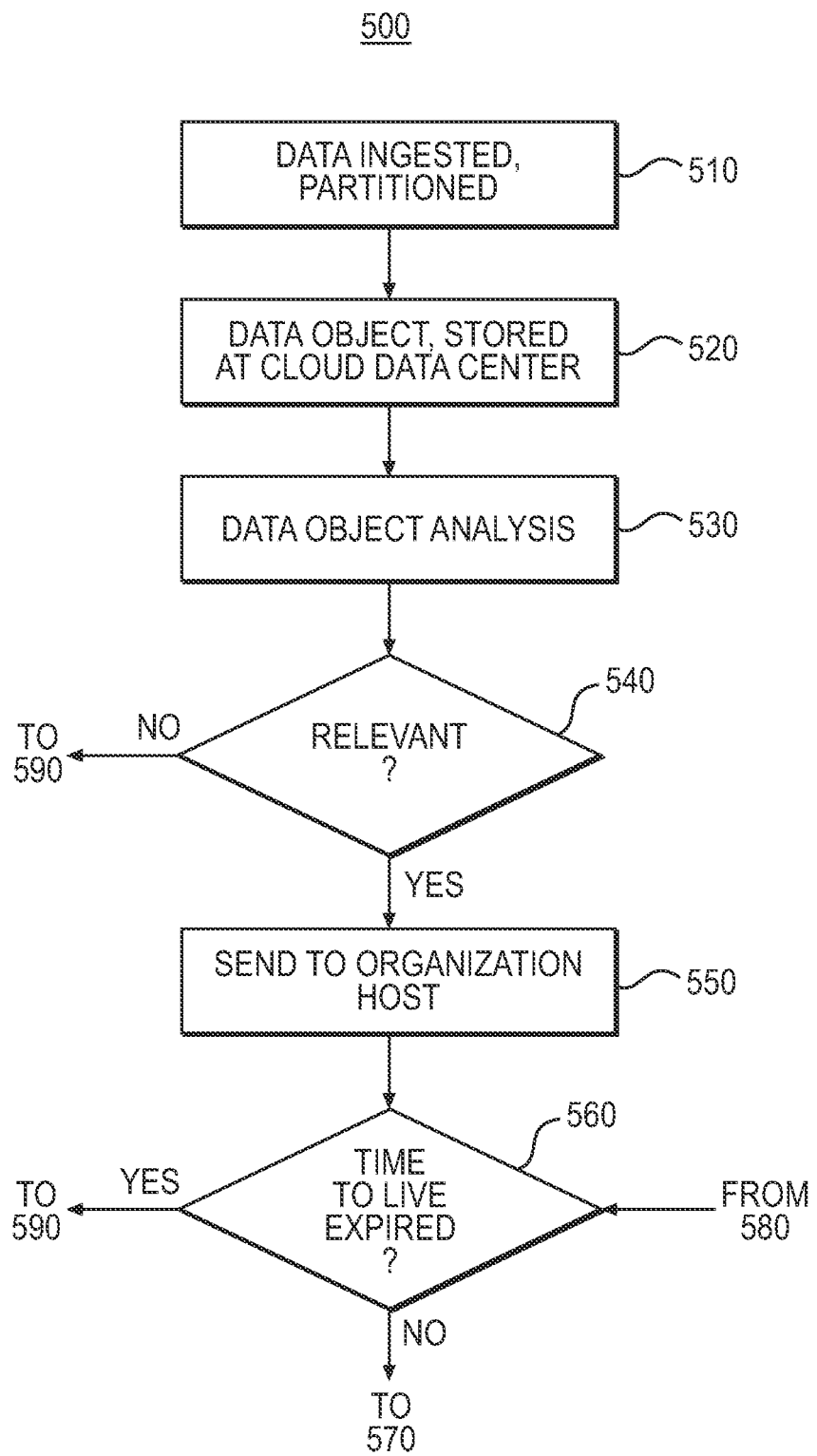
FIG. 5 illustrates yet another example operation of the ADP system of FIGS. 1A-1C.
Figure 5:
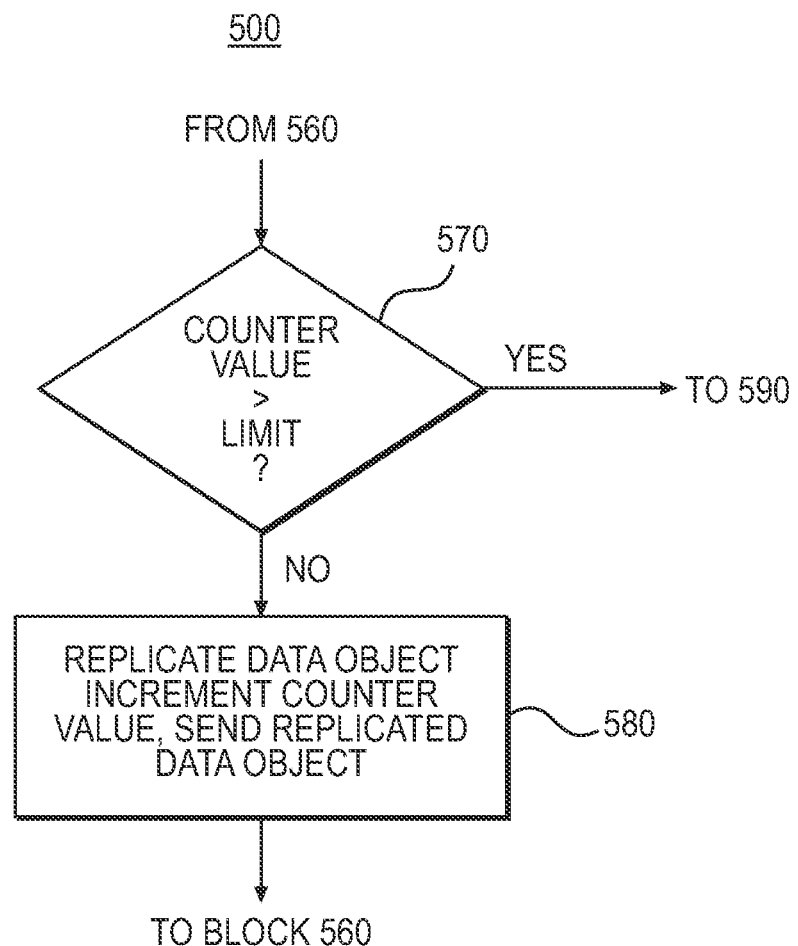
Figure 5:
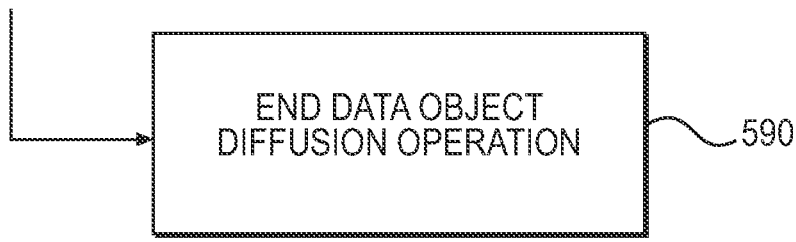

FIG. 5 illustrates an example data diffusion operation. In FIG. 5, data diffusion operation 500 begins in block 510 after data received at data ingestion module 110 is partitioned or fragmented to generate two or more data objects. In block 520, each data object is stored at the cloud data center 101. In block 530, each data object is analyzed to determine if the data object is relevant to a subset of specific organization hosts 104. In block 540, if the data object is not identified as relevant to a specific organization host 104, or a subset of organization hosts 104, operation 500 moves to block 590 and ends. If the data object is identified as relevant to a specific organization host 104 or group of organization hosts 104, the operation 500 moves to block 550, and the data object is sent to an identified, specific first organization host 104 and is stored therein in one of the organization host's cache memories 103, where the data block is assigned a counter value of 1. In block 560, the organization host 104 determines if the data object's time to live has expired. If the time to live has expired, the operation 500 moves to block 590 and operation 500 ends. If the time to live has not expired, the first organization host 104 determines (block 570) if the counter value is equal to a pre-determined data object density threshold. If the threshold value has been reached, the operation 500 moves to block 590. In block 570, if the threshold has not been reached, the operation 500 moves to block 580 and the organization host 104 replicates the data object, increments the counter value attached to the data object at the first organization host 104 and the counter value of the replicated data object, and sends the replicated data object to a second organization host 104, and the second organization host 104 stores the data object. The operation 500 then returns to block 560, and the second organization host 104 checks the time to live value. The operation 500 then continues. Thereafter, each organization host 104 may replicate (block 580) the data object and send the data object to its nearest neighboring organization host 104. Thus, for example, if the predetermined number of data objects is five, the fourth copy of the data object being sent will have the counter value 5 attached, and no further copies will be made or sent. As noted herein, to ensure the data objects are not maintained for longer than a predetermined time, the data object may have an associated time to live counter; upon expiration of the time to live, the diffusion operation 500 ends and each organization host 104 flushes the data object from its associated cache memory 103, block 590.

Certain of the devices shown in the Figures include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flowcharts and accompanying descriptions to illustrate the embodiments represented in FIGS. 3A-5. The disclosed devices, components, and systems contemplate using or implementing any suitable technique for performing the steps illustrated. Thus, FIGS. 3A-5 are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A method for reducing data transmission latency in a bandwidth-limited environment, comprising:
    ascertaining, by a computer, a need to disperse perishable data objects to one or more elements in a physical communications network each of the one or more elements comprising a cache memory configured to store the perishable data objects;
    creating an overlay to the physical communications network, the overlay comprising logical links between the computer and the one or more elements;
    employing the overlay, locating specific elements requiring the perishable data objects; and
    using the physical communications network, executing a dispersion operation causing one or more specific elements to receive the perishable data objects, comprising:
        choosing a first specific element to receive the data objects, comprising determining a specific element having a highest available bandwidth in the physical communications network for receipt of the data objects, and
        sending the perishable data objects to the first specific element, each of the perishable data objects having an assigned time to live value and an assigned, incrementing counter, wherein each perishable data object received by the first specific element is assigned a counter value of one, and wherein the first specific element:
            computes that the assigned time to live has not expired;
            discovers a second specific element having a next highest available bandwidth in the physical communications network for receipt of the perishable data objects;
            replicates the perishable data objects;
            changes the counter values of each of the replicated perishable data objects to two; and
            transmits the replicated perishable data objects to the second specific element.

2. The method of claim 1, wherein the computer ascertains the need to disperse perishable data objects to one or more elements in the physical communications network based on receipt of a data object request from at least one element.

3. The method of claim 2, wherein the data object request is received by a third specific element and the request is answered by one of the first and the second specific element.

4. The method of claim 1, wherein the time to live is based on one or more of a perishable nature of the data objects, a memory capacity of the receiving elements, a volumetric flow rate of the data objects, and a pre-set time.

5. The method of claim 1, wherein the counter comprises a maximum allowable count, wherein the maximum allowable count is reached, and wherein the elements stop the dispersion operation.

6. The method of claim 1, wherein the time to live for a perishable data object is reached, and elements storing the perishable data object flush the perishable data object from memory.

7. The method of claim 1, wherein the one or more elements are arranged in a sub-net, and wherein the computer receives geographical location information for one or more of the elements in the sub-net.

8. The method of claim 1, wherein the computer stores an original copy of the perishable data objects in a memory accessible by the computer.

9. The method of claim 1, wherein the computer ascertains the need to disperse data objects to one or more elements in the physical communications network based on historical information related to data object consumption by the one or more elements.

10. The method of claim 1, wherein the computer continues the dispersion operation until one of a pre-determined time and a pre-determined number of copies of the perishable data objects have been dispersed, and wherein the elements repeat steps of computing, discovering, replication, changing, and transmitting until the pre-determined number of copies of the perishable data objects have been dispersed.

11. The method of claim 1, wherein one or more elements are mobile elements, and wherein the computer tracks current locations of the mobile elements.

12. A method for controlling data transmission in a communications network, the network comprising a central node in communication with a plurality of dispersed elements, each element comprising at least one cache memory for storing data, the elements arranged in sub-nets within the network, a sub-net comprising a defined geographical location, the method, comprising:
    creating by a computer, a logical overlay to the communications network;
    receiving data objects from sources external to the communications network;
    identifying a utility of the received data objects to one or more of the elements;
    determining a perishability of the data objects having the utilities;
    assigning a time to live for each of the perishable data objects;
    assigning a counter with a counter value of 1 to each of the perishable data objects; and
    propagating the perishable data objects to selected ones of the one or more elements, comprising:
        through the overlay, identifying a first element having a highest available bandwidth for receiving the perishable data objects in at least one sub-net,
        sending the perishable data objects to the first element, and
        instructing the first element to:
            store the perishable data objects in cache memory;
            compute the time to live has not expired;
            increase the counter value by 1;
            through the overlay, discover a second element with a second highest bandwidth; and
            replicate and transmit each perishable data object having a non-expired time to live and an incremented counter value of 2 to the second element.

13. The method of claim 12, wherein the second element and one or more subsequent elements in the sub-net repeat steps of storing, computing, increasing, discovering, replicating, and transmitting, with ever-increasing counter values, until a stopping condition is met.

14. The method of claim 13, wherein the stopping condition is chosen from a group consisting of a pre-set time, expiration of the time to live, and a pre-determined number of elements receiving the perishable data objects.

15. The method of claim 13, wherein the time to live expires, the method comprising flushing the perishable data objects having expired times to live from the cache memories.

16. A method for controlling perishable data transmission in a hierarchical communications network, the network comprising a central node in communication with a plurality of dispersed hosts and dispersed elements, the host and elements arranged in sub-nets within the network, a sub-net comprising a defined geographical location, the method, comprising:
 creating an overlay to the communications network;
 receiving data objects from sources external to the communications network;
 identifying a utility of the received data objects to one or more of the elements;
 determining a perishability of the data objects having the utilities;
 assigning a time to live for each of the perishable data objects; and
 propagating the perishable data objects to selected ones of the one or more elements, comprising multicasting the data objects to each selected element in the sub-net until a stopping condition is met, the stopping condition chosen from a group consisting of a pre-set time, expiration of the time to live, and a pre-determined number of elements receiving the data objects.

17. The method of claim 16, wherein the central node broadcasts the data objects to one or more sub-net hosts, and a sub-net host sends the data objects to the elements, comprising the host:
 storing the data objects in a cache memory of the host;
 replicating the data objects;
 assigning a count to each of the replicated data objects; and
 multicasting the replicated data objects to each element in the sub-net.

18. A data communications system having enhanced data transmission latency and control, comprising:
 a physical communications network;
 a logical overlay to the physical communications network;
 a central computer complex comprising one or more central processors and a non-transitory computer-readable storage medium having encoded thereon machine instructions for computer-controlled operation of the system;
 a data object intake that receives data objects from sources external to the system;
 a plurality of data communications system elements, one or more elements in communication with the central computer complex over the physical communications network and over the logical overlay, each element comprising a non-transitory local data store and local machine instruction storage medium, and a local processor, each element in further communication with selected ones of the elements; and
 a hierarchical data object storage system comprising a central data store at the central computer complex and the local data stores for storing data objects received at the intake, wherein to control data object dispersal in the hierarchical data object storage system the central processor executes the machine instructions to:
 ascertain a need to disperse data objects received at the intake to one or more elements in the physical communications network, comprising for the received data objects, classify each data object as one of a perishable data object or a non-perishable data object,
 employ the overlay to locate specific elements requiring the perishable data objects, and
 using the physical communications network, execute a dispersion operation causing one or more specific elements to receive the perishable data objects, comprising:
  choose a first specific element to receive the perishable data objects, comprising determining a specific element having a highest available bandwidth in the physical communications network for receipt of the perishable data objects, and
  send the perishable data objects to the first specific element, each of the perishable data objects having an assigned time to live value and an assigned, incrementing counter, wherein the local processor of the first specific element:
  computes that the assigned time to live has not expired;
  stores the perishable data objects in the local data store and assigns locally-stored perishable data objects an incrementing counter a value of one;
  discovers a second specific element having a next highest available bandwidth in the physical communications network for receipt of the perishable data objects;
  replicates the perishable data objects and assigns each of the replicated perishable data objects a counter value of two; and
  transmits the replicated perishable data objects to the second specific element.

19. The system of claim 18, wherein the first specific element and the second specific element are arranged in a sub-net, the sub-net having a defined geographical area, the first specific element configured to:
 repeat the discovering, replicating, counter value incrementing, and transmitting for one or more additional elements in the sub-net, each receiving element receiving data objects having a serially-increasing counter value; and
 stop the repeating when a stopping condition is met, the stopping condition chosen from a group consisting of expiration of the time to live, the counter value reaching a pre-determined limit, and a pre-determined time limit.

20. The system of claim 19, wherein the stopping condition is expiration of the time to live, and wherein each element flushes the expired perishable data objects from a local data store of the element.

* * * * *